US009796209B2

(12) United States Patent
Goetz

(10) Patent No.: US 9,796,209 B2
(45) Date of Patent: Oct. 24, 2017

(54) PROCESS FOR PRODUCING THREE-DIMENSIONAL PATTERNS IN LIQUID-CRYSTALLINE COATINGS

(71) Applicant: Merck Patent GmbH, Darmstadt (DE)

(72) Inventor: Thomas Goetz, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 50 days.

(21) Appl. No.: 14/407,131

(22) PCT Filed: May 15, 2013

(86) PCT No.: PCT/EP2013/001435
§ 371 (c)(1),
(2) Date: Dec. 11, 2014

(87) PCT Pub. No.: WO2013/185872
PCT Pub. Date: Dec. 19, 2013

(65) Prior Publication Data
US 2015/0110999 A1 Apr. 23, 2015

(30) Foreign Application Priority Data

Jun. 12, 2012 (DE) .................. 10 2012 011 464

(51) Int. Cl.
*B41F 5/24* (2006.01)
*B44C 1/24* (2006.01)
*B44F 7/00* (2006.01)
*B42D 25/364* (2014.01)
*B44F 1/14* (2006.01)
*C09K 19/58* (2006.01)
*B05D 3/06* (2006.01)
*B42D 25/425* (2014.01)
*B42D 25/29* (2014.01)
*B42D 25/324* (2014.01)
*C09K 19/04* (2006.01)
*B05D 5/06* (2006.01)
*B05D 1/42* (2006.01)

(52) U.S. Cl.
CPC .................. *B44F 7/00* (2013.01); *B05D 3/06* (2013.01); *B41F 5/24* (2013.01); *B42D 25/29* (2014.10); *B42D 25/324* (2014.10); *B42D 25/364* (2014.10); *B42D 25/425* (2014.10); *B44C 1/24* (2013.01); *B44F 1/14* (2013.01); *C09K 19/586* (2013.01); *C09K 19/588* (2013.01); *B05D 1/42* (2013.01); *B05D 5/06* (2013.01); *B42D 2033/26* (2013.01); *B42D 2035/20* (2013.01); *C09K 2019/0448* (2013.01); *Y10T 428/24479* (2015.01)

(58) Field of Classification Search
CPC ..... B41F 5/24; B44C 1/24; B44F 7/00; B42D 25/29; B42D 25/425; C09K 19/586
USPC ......................................................... 427/356
See application file for complete search history.

(56) References Cited

U.S. PATENT DOCUMENTS

| | | | | |
|---|---|---|---|---|
| 4,205,018 A | * | 5/1980 | Nagasawa | C08F 290/06 427/507 |
| 2003/0189684 A1 | | 10/2003 | Kuntz et al. | |
| 2005/0037179 A1 | | 2/2005 | Schmitt et al. | |
| 2006/0292348 A1 | | 12/2006 | Schmitt et al. | |
| 2008/0145626 A1 | * | 6/2008 | Ginkel | B42D 5/027 428/198 |
| 2009/0084278 A1 | | 4/2009 | Masi et al. | |
| 2009/0115185 A1 | | 5/2009 | Hoffmuller et al. | |
| 2013/0288024 A1 | | 10/2013 | Clauter et al. | |

FOREIGN PATENT DOCUMENTS

| | | |
|---|---|---|
| DE | 102006015023 A1 | 10/2007 |
| DE | 102007022437 A1 | 11/2008 |
| DE | 102010054527 A1 | 6/2012 |
| DE | 102010054528 A1 | 6/2012 |
| EP | 1491357 A2 | 12/2004 |
| JP | 2003-251643 A | 9/2003 |
| JP | 2005-014613 A | 1/2005 |
| JP | 2006-161051 A | 6/2006 |
| JP | 2010-032884 A | 2/2010 |
| JP | 2010-256381 A | 11/2010 |
| JP | 2012-083643 A | 4/2012 |
| WO | 2011/017749 A1 | 2/2011 |

OTHER PUBLICATIONS

International Search Report dated Sep. 13, 2013 issued in corresponding PCT/EP2013/001435 application (pp. 1-3).
Rejection Notice dated Feb. 7, 2017 issued in corresponding JP 2015-516499 application (5 pages).
English Abstract of JP 2005-014613 A published Jan. 20, 2005.
English Abstract of JP 2006-161051 A published Jun. 22, 2006.
English Machine Translation of JP 2010-032884 A published Feb. 12, 2010 (20 pages).
English Machine Translation of JP 2010-256381 A published Nov. 11, 2010 (12 pages).
English Abstract of JP 2012-083643 A published Apr. 26, 2012.

* cited by examiner

Primary Examiner — Cachet Sellman
(74) Attorney, Agent, or Firm — Millen White Zelano & Branigan, P.C.

(57) ABSTRACT

The present invention relates to a method for producing three-dimensional macroscopic patterns in liquid-crystalline coatings, patterned layers containing liquid-crystalline materials and produced by said method, and the use thereof in decorative and security products. In the method, the liquid-crystalline coating in a non-solidified state is brought into contact with a printing form for a relief printing method, with the result that depressions which are not deeper than 10 μm arise in the coating.

15 Claims, No Drawings

PROCESS FOR PRODUCING THREE-DIMENSIONAL PATTERNS IN LIQUID-CRYSTALLINE COATINGS

The present invention relates to a process for producing three-dimensional patterns in liquid-crystalline coatings, to patterned layers comprising liquid-crystalline materials and produced by said process, and to the use of products which have layers of this type.

Decorative three-dimensional coatings, in particular on domestic consumer goods, such as wallpapers, decoration films and floorcoverings, are known and have already been used for some time. They give the said goods an exclusive appearance, which suggests depth and differs from conventional patterns in an advantageous manner. Solid substrates or also fully or partly unsolidified coatings located on solid substrates are for this purpose often subjected to an embossing process. In some applications, the three-dimensional embossing of the substrate or the coating is optically augmented by flake-form pigments present therein, since pigments of this type align along the embossing lines in the coating and thus have different reflection or scattering properties for the incident light at different locations in the coating, which causes an optical impression with spatial depth.

Similarly to coatings comprising flake-form pigments, in particular effect pigments, coatings on substrates which comprise liquid-crystalline materials have also already been provided with three-dimensional structures, but these are generally diffractive structures, which are of interest for classical display applications or for security products.

Experience with displays containing liquid-crystalline materials shows that liquid-crystalline materials or reactive mesogenic materials (materials of this type which carry reactive groups and either themselves have liquid-crystalline behaviour or alternatively can adopt a liquid-crystalline behaviour by reaction with further reactants) can align in preferential directions of the individual molecules at structures of surfaces with which they come into contact in the unsolidified state. Due to this form of alignment, small or relatively large areas of surfaces coated with liquid-crystalline materials can, as required, have certain optical properties, which are determined, in particular, by the type of liquid-crystalline material and the specific alignment.

Alignment layers of this type, which are generally produced by simple rubbing in a preferential direction or by roughening of the substrate surface by means of scratching elements, are regularly employed for the alignment of liquid-crystalline compounds in LCD applications (liquid-crystal displays).

Due to their particular optical properties, liquid-crystalline compounds are also occasionally employed in security products. Thus, for example, substrate structures which point in different directions in the plane result, on use of cholesteric liquid-crystalline compounds in coatings on substrates of this type, in different alignment of the liquid-crystal molecules in these layers in the plane and thus in a different colour of the individual part-areas in the coating. In this way, security elements having patterns of different colours can be produced in a relatively simple manner, since, in the case of sufficiently thin liquid-crystalline coatings, the alignment of the liquid-crystal molecules at a surface of the coating continues throughout the layer. Optical elements for security applications which are produced in accordance with this principle have been described, for example, in EP 1 227 447 A1.

If the substrates are provided with diffractive patterns, i.e. microstructures, diffractive optical elements (DOE), in which light diffraction effects also occur in addition to light refraction and reflection due to the interaction of light waves with objects whose size is smaller than or at most equal to that of the wavelength of the incident light (diffractive structures, in general in saw-tooth form), can thus be produced either by the substrates themselves, but also in coatings located above them. Effects of this type can produce a visible three-dimensional structure (hologram effect), but are mainly employed in a wide variety of optical applications (special spectacles, microprojection systems, etc.).

The alignment of liquid-crystalline compounds over alignment layers of the said type can of course also take place not through the liquid-crystalline compounds being applied to a structured substrate, but instead a structured area being brought into contact with the surface of a still unsolidified coating comprising liquid-crystalline compounds. Different alignment of the liquid-crystalline molecules in order to produce special colour effects can be produced here with only low mechanical effort, since the liquid-crystalline compounds re-align themselves in the plane very quickly and can also be fixed in this position.

Thus, for example, DE 102007022437 A1 describes a process for producing a crosslinked liquid-crystal layer in which a layer comprising unaligned liquid crystals is applied to a substrate, the liquid crystals in at least part of the layer are aligned by application of pressure, and the previously produced alignment is subsequently fixed by crosslinking of the layer. In this process, liquid-crystal layers are formed which exhibit a viewing angle-dependent colour-change effect in the aligned regions. The pressure tool used is a roller or a ram which forces the two-dimensional alignment of the liquid crystals in the regions to which pressure is applied with supply of heat in order to achieve a liquid state of the liquid crystals and under pressure. The production of optically three-dimensional patterns is not described.

Liquid-crystal films having diffraction patterns and variable alignment of the liquid-crystalline compounds over the layer cross section, in which diffraction patterns are introduced into crosslinked liquid-crystalline films with the aid of commercially available special embossing tools for diffraction patterns, are disclosed in EP 1 088 846 A1. However, the production of embossing instruments for the production of diffractive structures requires high precision and high equipment complexity, which is not appropriate for the production of merely decorative patterns. In addition, the diffractive 3D patterns or holograms which can be obtained therewith are also of only limited suitability for decorative purposes.

EP 1 879 154 A2 discloses a process for producing a security element in which, on a substrate coated with at least two layers lying one on top of the other, at least the upper layer of this coating is embossed while curing is still incomplete. The embossing here is preferably a microstructure, in particular a hologram or a diffractive structure. The layer located directly on the substrate, which is not embossed in this case, may be a layer comprising liquid-crystalline material.

Besides the described applications of aligned or microstructured liquid-crystal layers in particular applications, in particular in security applications, however, it would also be desirable likewise to be able to employ the optically interesting properties of liquid-crystalline layers for decorative purposes, in the case of which visible spatial effects which are not based on diffractive structures or on a hologram effect are at the forefront.

The object of the present invention is therefore to provide a simple and inexpensive process for producing macroscopic patterns in liquid-crystalline coatings on substrates which exhibit a clearly visible three-dimensional effect and in addition optionally optically variable colour effects or multicolour effects without diffractive structures being used.

A further object of the present invention consists in providing a polymeric or crosslinked layer comprising liquid-crystalline material which has a readily visible macroscopic pattern with a three-dimensional appearance and if necessary may also be self-supporting.

In addition, a further object of the present invention consists in indicating the use of the described layer comprising liquid-crystalline material.

The object of the present invention is achieved by a process for producing three-dimensional macroscopic patterns in liquid-crystalline coatings in which a flowable coating composition which comprises a polymerisable and/or crosslinkable mesogenic material is applied to a substrate, where a layer comprising mesogenic material is formed and, in an unsolidified state, is brought into contact with a tool which has a surface with raised elements on the surface of the layer facing away from the substrate in such a way that the raised elements of the tool produce permanent recesses in the layer, the tool is removed, and the layer is solidified by polymerisation and/or crosslinking, and the solidified layer is optionally separated from the substrate, where the tool is a printing plate for a relief printing process and the recesses in the layer are not deeper than 10 µm.

The object of the present invention is also achieved by a polymeric and/or crosslinked layer comprising mesogenic material which has a three-dimensional macroscopic pattern and has on one surface recesses which are not deeper than 10 µm and correspond in their outer shape to the outer shape of the three-dimensional pattern, where the coating is obtainable by the process described above.

The object of the invention is furthermore achieved by the use of the said layer comprising mesogenic material in decoration materials or security products.

The process according to the invention serves for the production of three-dimensional macroscopic patterns in liquid-crystalline coatings. The present invention therefore relates to a process for the production of three-dimensional patterns of this type.

In this process, firstly a conventional substrate, as described in greater detail below, is provided with a flowable coating composition which comprises a polymerisable and/or crosslinkable mesogenic material.

The degree of fluidity of the coating composition is determined here by the type of mesogenic material used, the use of solvents or diluents in the coating composition and by the type of application process.

As is generally known, various conventional application processes are viscosity-dependent, meaning that the viscosity of a coating composition has to be adjusted depending on the type of application process and the apparatuses belonging thereto. This adjustment is familiar to the person skilled in the art and does not require an inventive step. The viscosity of a coating composition here is inversely proportional to its fluidity. If a low-viscosity flowable coating composition is applied to a substrate, the viscosity increases during the drying or solidification operation that then commences, until, after some time, a high-viscosity, i.e. still flowable and thus still shapeable, coating is formed, which is subsequently converted into a solid or solidified, i.e. dry and no longer flowable, coating. In the case of high-viscosity coating compositions, the first solidification step is superfluous, the coating composition remains, depending on the materials employed, in a shapeable state for only a relatively short time. Depending on the drying or solidification process employed (supply of heat, curing accelerator, UV drying, oxidative drying), the entire solidification and drying operation can also proceed within very short time spans (tenths of seconds).

In the process according to the present invention, a layer which comprises polymerisable and/or crosslinkable mesogenic material and which is located on a substrate in an unsolidified and at the same time likewise in an uncrosslinked or unpolymerised state, i.e. is still in a flowable and shapeable, but generally not or no longer in a low-viscosity state, is then brought into contact, on the surface facing away from the substrate, with a tool which has raised elements on its surface, where, in accordance with the invention, this tool is a printing plate for a relief printing process. The totality of the raised elements (two-dimensional shaping) on the surface of the printing plate, more precisely on the part of the surface of the printing plate which is brought into contact with the first layer, represents the pattern to be transferred (two-dimensional shaping) in mirror-image form. To this extent, this corresponds very substantially to the way in which patterns are generally transferred to a substrate by conventional relief printing processes using relief printing plates, see the following explanation.

The surface of relief printing plates usually has raised elements which are all located at the same height level and whose outward-facing surface is covered with a printing ink, which is subsequently transferred to a material to be printed. The two-dimensional mirror image of the surface of the raised elements on the surface of the printing plate is thus formed on the material to be printed.

Suitable relief printing plates for the process according to the invention are the printing plates used in conventional relief printing processes, such as letterpress printing, letterset printing and flexographic printing, where flexographic printing plates are preferred, inter alia owing to their flexibility. The printing plates used are usually flat printing plates or printing cylinders.

In contrast to a conventional relief printing process, in the process according to the invention no printing ink is transferred on contact of the printing plate with the surface of a material to be printed. The material to be printed is likewise not a conventional medium, such as paper, board, polymer film or the like, but instead a substrate coated (preferably freshly) with a flowable layer which comprises polymerisable and/or crosslinkable mesogenic material and has not yet dried or solidified by polymerisation and/or crosslinking, where, in accordance with the invention, the raised elements on the relief printing plate penetrate into this layer to a depth of up to 10 µm. This corresponds to the principle of, albeit slight, wet embossing of this layer comprising mesogenic material, without the substrate also being embossed in the process. The printing plate is subsequently removed. Since the layer comprising the mesogenic material is still in a flowable, but preferably no longer low-viscosity state, the pattern produced in this way, which, in contrast to the two-dimensional patterns transferred in conventional relief printing processes, is a three-dimensional pattern (whose outer shape corresponds to the outer shape of the surface of the raised elements and which has a penetration depth of up to 10 µm), is retained in the layer, before this is finally solidified. Alternatively, a layer produced by means of a low-viscosity coating composition can also be deformed immediately after application to the substrate by the contact with the raised elements of a relief printing plate and solidified in situ immediately thereafter (for example by UV or electron-beam curing) if the thickness of the applied layer is sufficiently thin in order to be able to be cured through immediately after removal of the relief printing plate.

Since the polymerisable and/or crosslinkable mesogenic material employed in accordance with the invention generally has a phase-transition temperature below which the material is solid, but above which it is in a flowable, shapable state, it goes without saying that the process according to the invention is carried out at a temperature which is above the phase-transition temperature of the respective mesogenic material employed. If, by contrast, the temperature of the coating of the substrate pre-coated with the coating composition comprising the mesogenic material drops to a temperature below the phase-transition temperature before the relief printing tool has penetrated into the coating, prior warming of the layer obtained to a temperature above the phase-transition temperature of the mesogenic material used is necessary.

In accordance with the invention, the recesses in the still unsolidified layer comprising polymerisable and/or crosslinkable mesogenic material are not deeper than 10 μm, preferably not deeper than 5 μm. These recesses may be somewhat flattened out, i.e. have a lower depth than 10 μm in the solidified first layer, on solidification of the layer due to slight flow of the embossed contours of the raised elements of the printing plate. Since, in accordance with the invention, relief printing plates are used for the production of the recesses in this layer, the depth of all recesses in the layer is virtually identical. It is thus ensured that the visibility of the three-dimensional pattern is ensured equally well at any desired point of the pattern-carrying layer, that the colour effects are the same at each embossing point of the pattern-carrying layer and that there are no deep embossings in this layer.

The depth of the recesses in the layer solidified by polymerisation and/or crosslinking of the mesogenic material is from 1 to 10 μm, preferably from 1 to 5 μm, in particular from 1 to 3 μm. Recesses of this type are so slight that they are non-tactile to humans, i.e. cannot be felt as embossings on touching or moving over the first layer embossed in accordance with the invention with a human body part, preferably a finger or a hand.

The solidification of the layer comprising the mesogenic material and having the recesses produced in accordance with the invention is initially carried out, if necessary, by physical drying or optionally by reducing the temperature of the layer to a temperature below the phase-transition temperature, and, subsequently to or simultaneously with the drying or solidification or as the sole solidification measure, by polymerisation and/or crosslinking of the mesogenic material.

Physical pre-drying of the layer comprising the mesogenic material may, in addition, also be necessary even before the embossing step in accordance with the invention, depending on the composition of this layer, in particular with respect to the solvent content.

Whereas physical drying is generally carried out by evaporation of the solvent content in the coating composition and can be supported by the supply of heat, a reduction in the temperature to a value below the phase-transition temperature of the mesogenic material may result in solidification of the layer in the case of solvent-free coating compositions. However, fixing of the recesses obtained in the surface of the layer must subsequently be carried out in all cases by polymerising and/or crosslinking the layer comprising mesogenic materials. The last-mentioned reactions are, as is generally usual in the case of polymerisable and/or crosslinkable liquid-crystalline materials, preferably supported by the use of actinic radiation, here in particular by UV and/or IR radiation.

The polymerisation and/or crosslinking of the layer comprising the mesogenic material can be carried out here, depending on the type of material, under ambient conditions or under protective gas.

The layer comprising the polymerisable and/or crosslinkable mesogenic material in the process according to the invention preferably has a thickness (wet thickness) of 1 to about 10 μm, in particular 2 to 8 μm and particularly preferably 3 to 6 μm. In exceptional cases, layer thicknesses up to twice the values indicated can also be employed.

It goes without saying here that the wet thickness of the layer is not less than the recesses produced in accordance with the invention in the still unsolidified layer. In the extreme case, the wet layer thickness of the layer corresponds to the depth of the recesses in precisely this layer. However, the wet thickness of the layer is usually greater than the depth of the recesses in this layer. The same also applies in each case to the dry layer thickness of the layer in relation to the recesses in the solidified layer.

It is obvious that the wet layer thickness of the layer comprising the mesogenic material is determined to a crucial extent by the process by which this layer is applied to the substrate to be coated.

Suitable coating processes for the application of the first layer here are all coating processes usual in the art which produce a moist, shapeable coating having adequate wet layer thickness on a substrate to be coated and in which liquid-crystalline materials can be employed. For this purpose, conventional coating processes, but also printing processes, can advantageously be employed.

The processes are preferably printing processes, for example a gravure printing process, a screen printing process, paper coating process, a flexographic printing process, a pad printing process, an offset printing process or an offset overprint varnishing process.

However, likewise conventional coating processes, such as a lacquering process, a spray lacquering process (air brush, spraying), a coil coating process or a reverse-roll coating process, can also be employed.

Particular preference is given to a gravure printing process or a screen printing process, in particular a gravure printing process, for the application of the layer comprising the mesogenic material.

The application of the layer comprising the mesogenic material to the substrate to be coated is carried out over the entire surface, at least in the region which is to be provided with the three-dimensional pattern in accordance with the present invention. This region may of course also only represent a part-region of the entire surface of a substrate if only parts of the surface of the substrate are to be provided with a three-dimensional pattern produced in accordance with the invention.

Suitable substrates are all conventional materials which are usually employed as base or support materials for decorative and security products. Accordingly, the substrate employed in accordance with the invention is preferably paper, cardboard, wallpaper, a laminate, a tissue material, wood, a polymer, in particular a polymeric film, a metal, in particular a metal foil, a security printing product or a material which comprises constituents comprising a plurality of these substances. As is generally usual, in particular, in the case of papers and polymer films, the substrate may optionally also have been electrostatically pre-treated and/or provided with a primer layer and/or with an alignment layer and/or with another anchoring layer.

Base layers of this type, in particular on papers or polymer films, are generally known to the person skilled in the art and are usual in the art and therefore do not require further explanation. As pre-treatment for a subsequent coating with a layer comprising polymerisable and/or crosslinkable mesogenic material, however, it is advisable to provide a strongly absorbent or black layer on the surface of the substrates in the case of subsequent coating with cholesteric (chiral nematic) or chiral smectic mesogenic material, whereas a reflective coating of the surface of the substrate is advantageous in the case of subsequent coating with nematic mesogenic material. Both types of surface coating serve for better visualisation of the optical effects in relation to the mesogenic material respectively used and are, as such, likewise to be considered as usual in the art in combination with the corresponding mesogenic coatings. Both types of pre-coating of the substrate may in each case also be combined with an alignment layer, which is likewise usual in the art and should, if present, be located between absorbent or reflective pre-coating and the layer comprising the mesogenic material. As an alternative to black or strongly absorbent or also reflective coatings on the substrates, it is also possible to select substrates which are per se already black, strongly absorbent or reflective.

As already mentioned above, it is known that liquid-crystalline compounds can align with their principal molecular axes against the structure of structured surfaces. The still unsolidified layer comprising mesogenic material in the process according to the invention thus contains the molecules of the mesogenic material in substantially parallel alignment with the substrate, which is usually planar. If no special alignment layer is present on the substrate, the molecular axes of the mesogenic material are in unaligned form in the plane, but are substantially parallel to the substrate. If, however, an alignment layer is present on the substrate, the molecules of the mesogenic material align in a preferential direction on the substrate, namely along the substrate structure, which is usually produced by rubbing in a preferential direction, and likewise substantially parallel to the substrate surface.

Due to contact with the printing plate for a relief printing process, at least the surface of the layer comprising the shapable, as yet unpolymerised and/or crosslinked mesogenic material is permanently deformed to a depth of 10 μm at the contact points, recesses are formed. At these contact points, the mesogenic molecules present in this layer are turned with their principal axes out of their substantially parallel alignment in relation to the substrate surface and adopt, depending on their position within the contact point, an alignment which has a certain tilt to the surface of the coated substrate, i.e., for example, is positioned obliquely or also perpendicular thereto. By contrast, the mesogenic molecules which are located outside the contact points of the printing plate with the layer in the latter retain their substantially parallel alignment with the substrate surface. In this way, the three-dimensional impression left in the layer comprising the mesogenic material by the raised elements on the surface of the relief printing tool is replicated by the mesogenic molecules present there, which, due to their turning out of an alignment parallel to the substrate, have a modified reflection behaviour for the incident light, so that a three-dimensional pattern which corresponds in the broader sense to the mirror image of the pattern embossed into the first layer by the raised elements on the printing plate, and may at the same time exhibit multicolour effects and optically variable effects, becomes visible in the layer comprising the mesogenic material. Depending on the type of mesogenic material employed and depending on whether an absorbent or reflective pre-coating are additionally present on the substrate, this three-dimensional pattern is either detectable with the naked eye or alternatively in full or part only through a circular or linear polariser. The three-dimensional pattern here may appear coloured, multicoloured, coloured with colour flop effect (optically variable), glossy, with a bright/dark appearance and/or metallic. In the broadest sense, the three-dimensional pattern which is "embossed" into the surface of the layer and which cannot be detected by tactile means is only rendered visible and thus perceptible by the turning-out of the molecules of the mesogenic material in this layer. Surprisingly, it has been found that even extremely slight "embossing" of the layer is sufficient to cause considerable optically detectable changes in the alignment of the mesogenic molecules in the coating. The visible three-dimensional pattern in the layer thus appears significantly more strongly than would be expected after the slight change in shape at the surface of the layer comprising the mesogenic material and may also be reinforced by striking colour effects, depending on the composition of the layer.

"Substantially parallel alignment" in the sense of the present invention is taken to mean both geometrically parallel alignment of the mesogenic molecules in relation to the surface of the substrate to be coated (and the surface of the layer comprising the mesogenic material) and also alignment with deviations therefrom up to an angle of about 10 degrees. However, the term "parallel" is generally used for "substantially parallel" below.

A protective layer or alternatively also a sequence of further layers having different functionality, in particular for security applications, can optionally be applied to the layer comprising the mesogenic material after solidification thereof by polymerisation and/or crosslinking. Detachment of the polymeric and/or crosslinked layer obtained from the substrate can optionally also be carried out after the polymerisation and/or crosslinking of the mesogenic material. For this purpose, the base substrate is advantageously provided with a release layer. Alternatively, however, materials which do not form an adherent connection to one another may also be selected for the substrate and the subsequent coating, so that a release layer is dispensable. A self-supporting polymeric layer obtained in this way comprising mesogenic material can subsequently be applied to other substrates or layer composites or introduced into these.

Such embodiments of the present invention can advantageously be employed, in particular, for use in security applications, for example in security strips on banknotes, tickets, etc.

The polymerised and/or crosslinked mesogenic material is a material which is obtained by polymerisation and/or crosslinking, preferably by in situ polymerisation and/or crosslinking, of polymerisable or crosslinkable mesogenic materials. Materials of this type are nematic, smectic or chiral nematic (cholesteric) materials. Preference is given to the use of nematic or cholesteric materials, which in each case cause different optical effects in the layer obtained in accordance with the invention which has a three-dimensional pattern.

It is known that coatings which, when applied to an absorbent substrate, can result in angle-dependent colour changes of the applied layer can be obtained using cholesteric liquid-crystalline materials. The substrates coated with polymerisable and/or crosslinkable cholesteric mesogenic materials employed in accordance with the invention may thus have angle-dependently variable (optically variable) colour effects merely through the use of these materials.

By contrast, nematic liquid-crystalline materials enable the production of coatings which, against a reflective background, are themselves colourless and thus visibly have the colour of the respective substrate. If, by contrast, suitable dyes, coloured pigments, effect pigments or the like are added to the nematic mesogenic materials employed in accordance with the invention or if they are applied to a coloured reflective substrate, they exhibit a uniform coloration when the security element is viewed without aids. If the layer having 3D pattern which are obtained using nematic mesogenic materials are intended to have angle-dependent colours, it is necessary for them to be applied to a reflective substrate which has angle-dependent colours (optically variable) or for the coating composition to comprise optically variable flake-form effect pigments. The optically variable substrate may be, for example, a substrate pre-coated with optically variable flake-form effect pigments. The substrates having a nematic mesogenic layer which have been coated in this way have a hidden three-dimensional pattern which can only be detected using a linear polariser, and optionally a visible, coloured or optically variable appearance.

The cholesteric polymerisable mesogenic materials which are preferably employed in accordance with the present invention are therefore preferably applied in the layer comprising them on a black, grey or dark-coloured substrate, which also need only be partly dark-coloured. By contrast, the nematic polymerisable mesogenic materials are preferably applied to an at least partly reflective substrate.

The reflective substrate can be a metallic or metallised substrate, which preferably has one or more metal layers. Substrates of this type may also be surfaces of holograms, kinegrams or of hot-embossing films. Suitable metallic or metallised substrates are, for example, those with layers of Al, Cu, Ni, Ag, Cr or alloys, such as Pt/Rh or Ni/Cr. However, the reflective layers on the substrate may also be produced by application of a coating comprising reflective pigments. Particularly suitable reflective pigments here are metal pigments comprising aluminium, gold or titanium, but also flake-form effect pigments comprising non-metallic materials, which may likewise have highly reflective properties. This applies, in particular, to the said generally known metal-effect pigments, which have metal-like properties with respect to light reflection.

If reflective pigments of this type are added to the polymerisable nematic mesogenic material directly in the coating composition, these likewise form a reflective background in the coating without the substrate having to be made reflective separately.

Polymerisable or crosslinkable mesogenic materials in the sense of the present invention are taken to mean those mesogenic materials which can be polymerised or crosslinked directly on a substrate. The substrate here can be either a substrate on which the polymerisable and/or crosslinked layer applied subsequently remains or an auxiliary substrate, on which a film essentially consisting of mesogenic material and optionally suitable additives is cured and is subsequently applied with or without the auxiliary substrate in the form of a film to a further substrate employed independently of the process according to the invention and is processed further in this multilayered system to give the decorative or security product. The latter is preferably carried out by means of an adhesive layer or in the form of a heat-sealing film.

The auxiliary substrate is preferably a polymeric substrate, a metallised polymeric substrate, a metallic substrate, a conventional transfer element, which is usually built up from a plurality of layers of suitable materials, such as polymer layers, paper layers, metal layers, adhesive layers, anti-adhesion layers, etc., or the like.

The mesogenic material for the coating composition is preferably an in-situ polymerisable or crosslinkable material which polymerises and/or crosslinks during or after evaporation of a solvent, if present, and is present in the (in-situ) polymerised and/or crosslinked form in the product obtained in accordance with the present invention. It preferably comprises at least one polymerisable mesogenic compound which contains a polymerisable functional group and at least one further polymerisable mesogenic compound which contains two or more polymerisable functional groups.

For the purposes of the invention, mesogenic compounds or materials are taken to mean those which contain one or more rod-shaped, plank-shaped or disc-shaped mesogenic groups, i.e. those which are able to induce a liquid-crystalline behaviour. Such compounds may, but need not necessarily, themselves have liquid-crystalline phases. It is likewise possible for them to exhibit liquid-crystalline behaviour only in a mixture with other compounds or after polymerisation.

If the polymerisable material comprises polymerisable mesogenic compounds which contain two or more polymerisable functional groups (di- or multireactive or di- or multifunctional compounds), a three-dimensional network which is self-supporting and has high mechanical and thermal stability and low temperature dependence of its physical and optical properties is formed during the polymerisation. For example, the phase-transition temperature, which is important for mechanical stability, can be adjusted in a simple manner via the concentration of the multifunctional mesogenic compounds.

The polymerisable mesogenic mono-, di- or multifunctional compounds can be prepared by generally known processes. Such processes are described, for example, in Houben-Weyl, Methoden der organischen Chemie [Processes of Organic Chemistry], Thieme-Verlag, Stuttgart. Typical examples are disclosed in WO 93/22397; EP 0 261 712; DE 19504224; DE 4408171 and DE 4405316. However, the compounds described therein serve merely for illustration and are not intended to be regarded as restrictive.

Examples of particularly suitable monoreactive polymerisable mesogenic compounds are shown in the following list of compounds. These serve for illustration of the invention and in no way for restriction thereof.

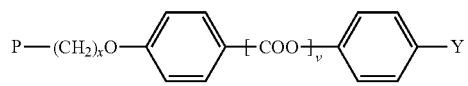
(Ia)

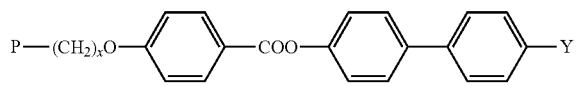
(Ib)

-continued
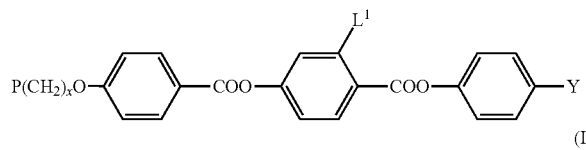 (Ic)
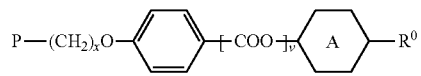 (Id)
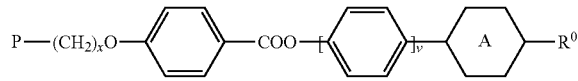 (Ie)
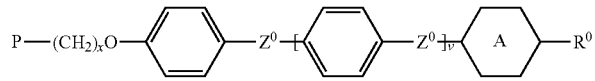 (If)
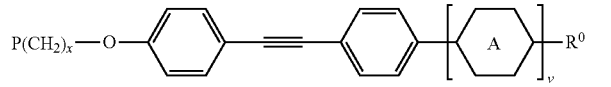 (Ig)
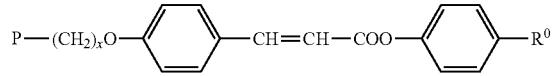 (Ih)
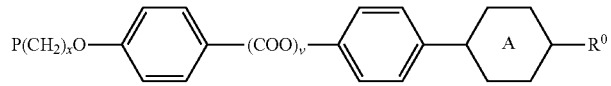 (Ii)
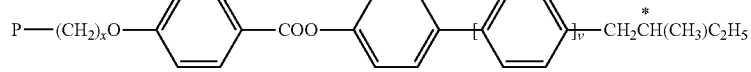 (Ik)
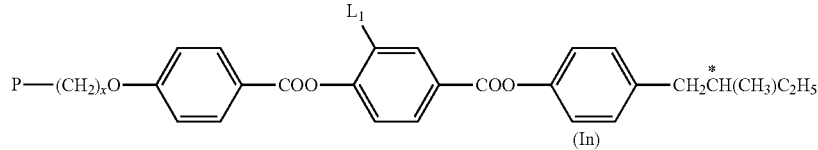 (Im)
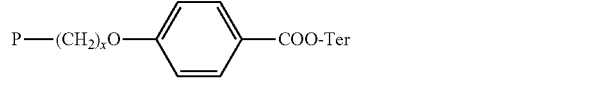 (In)
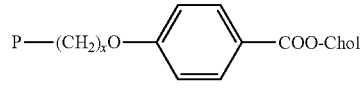 (Io)
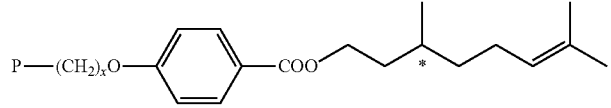 (Ip)
Examples of particularly suitable direactive polymerisable mesogenic compounds are shown in the following list, but should likewise not be regarded as restrictive.
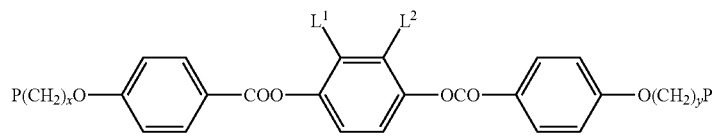 (IIa)
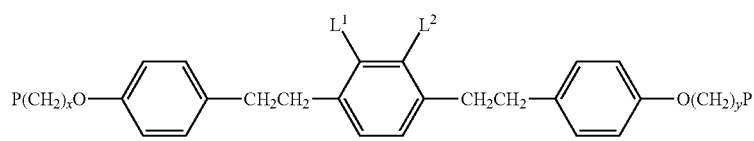 (IIb)
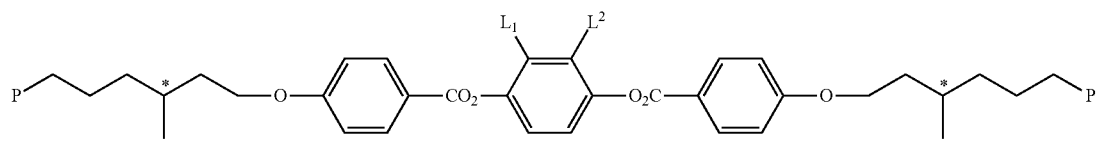 (IIc)

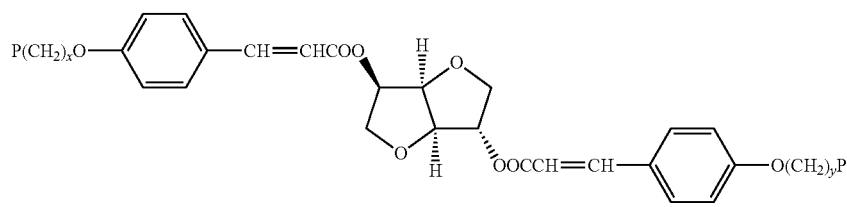

(IId)

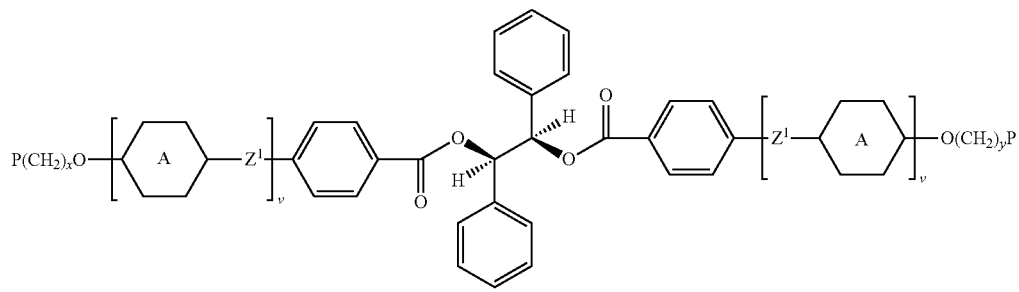

(IIe)

In the formulae indicated above, P denotes a polymerisable group, preferably an acrylic, methacrylic, vinyl, vinyloxy, propenyl, ether, epoxide or styryl group, x and y, independently of one another, denote 1 to 12, A denotes 1,4-phenylene, which is optionally mono-, di- or trisubstituted by $L^1$, or denotes 1,4-cyclohexylene, v denotes 0 or 1, $Z^0$ denotes —COO—, —OCO—, —CH$_2$CH$_2$— or a single bond, Y denotes a polar group, Ter denotes a terpenoid radical, such as, for example, menthyl, Chol denotes a cholesteric group, $R^0$ denotes a nonpolar alkyl or alkoxy group, and $L^1$ and $L^2$ each, independently of one another, denote H, F, Cl, CN or an optionally halogenated alkyl, alkoxy, alkylcarbonyl, alkoxycarbonyl or alkoxycarbonyloxy group having 1 to 7 C atoms.

In this connection, the expression "polar group" denotes a group selected from F, Cl, CN, NO$_2$, OH, OCH$_3$, OCN, SCN, an optionally fluorinated carbonyl or carboxyl group having up to 4 C atoms or a mono-, oligo- or polyfluorinated alkyl or alkoxy group having 1 to 4 C atoms. The expression "nonpolar group" denotes an alkyl group having 1 or more, preferably 1 to 12 C atoms or an alkoxy group having 2 or more, preferably 2 to 12 C atoms.

If cholesteric liquid-crystalline materials (CLCs) are used, these preferably comprise a nematic or smectic host material and one or more chiral dopants which induce the helical twist of the host material. These chiral dopants may be polymerisable or not. Although they may be mesogenic or liquid-crystalline compounds, the dopants do not necessarily have to be liquid-crystalline.

Particular preference is given to chiral dopants having a high helical twisting power (HTP), in particular such as the compounds disclosed in the formulae I and IIa to IIk in WO 98/00428. Further chiral dopants which are typically used are, for example, the compounds available under the name S 1011, R 811 or CB 15 from Merck KGaA, Darmstadt.

Particular preference is given to chiral dopants of the following formulae:

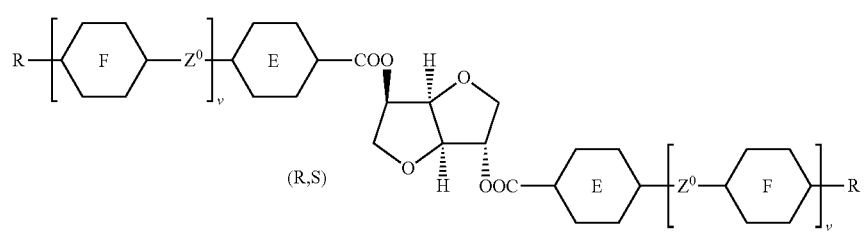

III

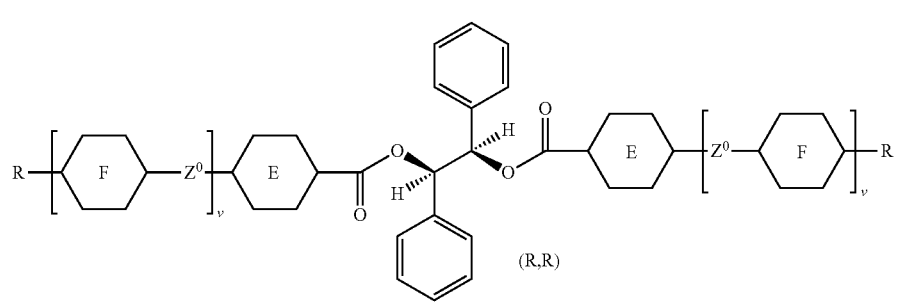

IV including the (R,S), (S,R), (R,R) and (S,S) enantiomers, which are not mentioned.

E and F here have, independently of one another, one of the meanings of A as described above, v denotes 0 or 1, $Z^0$ denotes —COO—, —OCO—, —CH$_2$CH$_2$— or a single bond, and R denotes alkyl, alkoxy, carbonyl or carbonyloxy having 1 to 12 C atoms.

The compounds of the formula III are described in WO 98/00428, while the synthesis of the compounds of the formula IV is disclosed in GB 2,328,207.

Polymerisable chiral compounds are preferably selected from the compounds of the formulae Ik to Ip and IIc to IIe. It is likewise possible to select compounds of the formulae Ia to Ii in which $R^0$ or Y contains a chiral C atom.

The amount of the chiral dopants in the mesogenic material is preferably less than 15% by weight, in particular less than 10% by weight, particularly preferably less than 5% by weight, based on the total weight of the mesogenic material (without solvent). In a particularly preferred embodiment of the present invention, the mesogenic material is present in the flowable coating composition without addition of solvents, diluents, dispersion media and free from other, non-mesogenic, polymerisable or polymeric binders or binder constituents. Apart from the requisite assistants for the polymerisation, for example the polymerisation initiators, and the assistants which are necessary for simple application of the coating composition to the substrate, the flowable coating composition in this case therefore consists virtually exclusively of the polymerisable and/or crosslinkable mesogenic material. Such a composition of the layer has the advantage that the coating composition virtually from the beginning has a viscosity which allows the introduction of permanent recesses with the aid of the relief printing plate employed in accordance with the invention, without a corresponding viscosity first having to be established by complex evaporation of the solvent. Coating compositions of this type can also be printed directly. Polymerisation and/or crosslinking of this layer can equally be carried out without additional solvent evaporation immediately after introduction of the recesses into the mesogenic layer.

Suitable coating compositions of this type are described, for example, in U.S. Pat. No. 7,344,762 B2.

In particular, coating compositions of this type comprise a mesogenic material which comprises at least one compound of the following formulae:

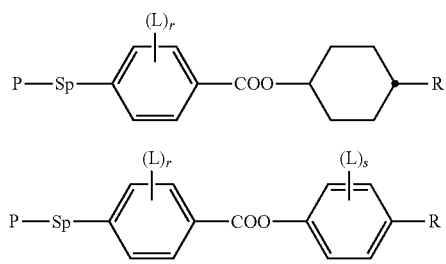

where
P represents a polymerisable group,
Sp represents a spacer group or a single bond,
R is halogen, a straight-chain or branched alkyl group having 1 to 20 C atoms, which may be unsubstituted, monosubstituted or polysubstituted by F, Cl, Br, I or CN, and where one or more non-adjacent CH$_2$ groups may optionally be replaced, in each case independently of one another, by —O—, —S—, —NH—, —NR$^0$—, —SiR$^0$R$^{00}$—, —CO—, —COO—, —OCO—, —OCO—O—, —SO$_2$—, —S—CO—, —CO—S—, —CH=CH— or —C≡C— in such a way that O and/or S atoms are not connected directly to one another, $R^0$ and $R^{00}$ are, independently of one another, H or an alkyl group having 1 to 12 C atoms, L is F, Cl, Br, or an alkyl, alkoxy, alkylcarbonyl or alkoxycarbonyl group having 1 to 12 C atoms, where one or more H atoms have optionally been replaced by F or Cl, and r and s are, independently of one another, 0, 1, 2, 3 or 4.

Particular preference is given to compounds in which s and r are equal to 0.

The following individual compounds may be mentioned by way of example of this group of compounds:

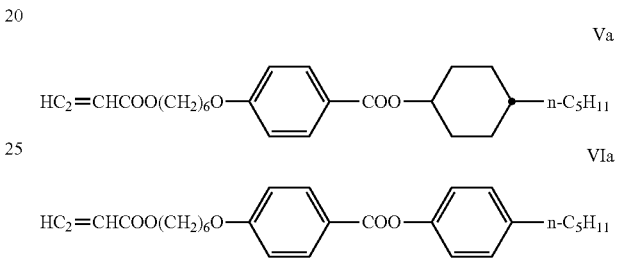

Ia: C 43.5 (N 34.8) I
IIa: C 62.4 (N 32) I

This means that, although they do not per se have a liquid-crystalline phase, they exhibit a behaviour in the mixture with other liquid-crystalline compounds as if they have a crystal-nematic phase-transition temperature of 34.8 and 32° C. respectively. They are therefore particularly suitable for the preparation of a polymerisable mesogenic material for printing processes.

The polymerisation of the polymerisable mesogenic material is effected by the action of heat or photochemically active radiation on the polymerisable material. Photochemically active radiation (actinic radiation) is taken to mean the influence of light, for example UV light, IR light or visible light, the influence of X-rays or gamma radiation or irradiation with high-energy particles, for example ions or electrons. The polymerisation is preferably carried out by means of UV irradiation. The radiation source used for this purpose can be a single UV lamp or also a set of UV lamps. The curing time can be reduced by high luminous intensity. A further source of photochemically active radiation can also be lasers, for example UV lasers, IR lasers or visible lasers.

The polymerisation is carried out in the presence of a polymerisation initiator which absorbs at the wavelength of the photochemically active radiation. If, for example, the polymerisation is carried out by means of the influence of UV light, it is possible to use a photoinitiator which is decomposed under the influence of UV radiation with formation of free ions or radicals which initiate the polymerisation reaction. If polymerisable mesogens containing acrylate or methacrylate groups are polymerised, a free-radical photoinitiator is preferably used. In the case of polymerisation of polymerisable mesogenic vinyl and epoxide groups, by contrast, a cationic photoinitiator is preferably used. It is likewise possible to use a polymerisation initiator which decomposes under the action of heat with formation of free radicals or ions which initiate the polymerisation.

The photoinitiator used for the free-radical polymerisation can be, for example, the commercially available compositions Irgacure 651®, Irgacure 184®, Darocur 1173® and Darocur 4205® (from Ciba Geigy AG), while cationic photopolymerisation can preferably be carried out using the commercially available initiator with the name UVI 6974® (Union Carbide). The polymerisable liquid-crystalline material preferably comprises 0.01 to 10% by weight, in particular 0.05 to 5% by weight, and particularly preferably 0.1 to 3% by weight, of a polymerisation initiator. UV photoinitiators are preferred, in particular free-radical UV photoinitiators.

The curing time is dependent, inter alia, on the reactivity of the polymerisable mesogenic material, the thickness of the applied layer, the type of photoinitiator and the strength of the UV lamp. The curing time is preferably not longer than 10 minutes, in particular not longer than 5 minutes and particularly preferably shorter than 2 minutes. For continuous production of the layer having a three-dimensional pattern obtained in accordance with the invention, short curing times of 3 minutes or shorter, preferably 1 minute or shorter and particularly preferably 30 seconds or shorter, are preferred.

The polymerisable mesogenic material may additionally also comprise one or more suitable components, such as, for example, catalysts, sensitisers, stabilisers, inhibitors, co-reacting monomers, surface-active substances, lubricants, wetting agents, dispersants, hydrophobicising agents, adhesives, flow improvers, antifoams, degassing agents, diluents, reactive thinners, assistants, dyes or pigments.

In order to prevent undesired spontaneous polymerisation of the polymerisable material, for example during storage, the addition of stabilisers is preferred. Stabilisers which can be employed here are all compounds which are known to the person skilled in the art for this purpose. A wide range of such compounds are commercially available. Typical examples of stabilisers are 4-ethoxyphenol and butylhydroxytoluene (BHT).

Other additives, for example chain-transfer reagents, may likewise be added in order to modify the physical properties of the resultant polymer film. If, for example, monofunctional thiol compounds, such as dodecanethiol, or multifunctional thiol compounds, such as, for example, trimethylolpropane tri-3-mercaptopropionate, are added as chain-transfer reagent, the length of the free polymer chains and/or the length of the polymer chains between two crosslinking sites can be controlled. If the amount of chain-transfer reagent is increased, the length of the polymer chains in the resultant polymer film decreases.

In order to increase the degree of crosslinking of the polymers, up to 20% by weight of non-mesogenic compounds containing two or more polymerisable functional groups may also be added alternatively or in addition to the di- or multifunctional polymerisable mesogenic compounds. Typical examples of difunctional non-mesogenic monomers are alkyl diacrylates or alkyl dimethacrylates containing alkyl groups having 1 to 20 C atoms. Typical examples of non-mesogenic monomers containing more than two polymerisable groups are trimethylolpropane trimethacrylate and pentaerythritol tetraacrylate.

In another embodiment, the polymerisable material comprises up to 70% by weight, preferably 3 to 50% by weight, of a non-mesogenic compound containing a polymerisable functional group. Typical representatives of monofunctional non-mesogenic monomers are alkyl acrylates and alkyl methacrylates.

In order to adjust the optical properties of the resultant polymeric film, it is also possible for up to 20% by weight of a non-polymerisable liquid-crystalline compound to be added.

The polymerisation is preferably carried out in the liquid-crystalline phase of the polymerisable material. For this reason, polymerisable mesogenic compounds or mixtures having low melting points and a broad liquid-crystal phase are preferably used. The use of such materials enables the polymerisation temperature to be reduced, which simplifies the polymerisation process and is particularly advantageous for continuous production. The choice of a suitable polymerisation temperature depends substantially on the clearing point of the polymerisable material and on the softening point or flash point of the substrate. The polymerisation temperature is preferably at least 30 degrees below the clearing point of the polymerisable mesogenic material. Polymerisation temperatures below 120° C. are preferred, in particular temperatures below 90° C. and particularly preferably polymerisation temperatures of 60° C. or below.

The optical colour and/or colour-change effects which can be achieved by the special mesogenic materials are not crucial per se for the success of the present invention. Rather, the success according to the invention is achieved by the change in the optically perceptible effect of the mesogenic material at the points of the coating which come into contact with the raised elements of the relief printing plate in accordance with the process according to the invention and are thus rotated out of their parallel alignment with the surface of the substrate. At the same time, and through the production of permanent recesses in the layer comprising the mesogenic material, a three-dimensional pattern is produced in the coating and is perceptible via the optical effects rendered visible by the mesogenic materials. The visible three-dimensional pattern here is significantly more pronounced than would have been expected from the actual deformation of the coating, since rotation of the mesogenic molecules out of the parallel position, even by only a few angle degrees, already results in a significant change in their reflection properties, which results in an optically clear enhancement of the three-dimensional embossing of the layer.

Besides the mesogenic material, the coating composition for the layer provided with the pattern may also comprise at least one binder and optionally at least one solvent and optionally one or more assistants, as has already been described above.

Suitable binders for coating compositions are in general conventional binders, in particular those based on nitrocellulose, polyamide, acrylic, polyvinylbutyral, PVC, PUR or suitable mixtures thereof, and in particular binders on a UV-curable basis (free-radical or cationic curing).

Binders of this type are transparent, so that they do not adversely affect the colour of the mesogenic material and the three-dimensional pattern produced in the layer. However, it is very preferred for no polymerisable polymeric binders to be present in the layer.

Furthermore, the coating composition for the layer comprising the mesogenic material may optionally also comprise at least one solvent, which preferably consists of organic solvents or of organic solvent mixtures.

Organic solvents which can be used are all solvents usually used in the said coating processes, for example branched or unbranched, straight-chain or cyclic alcohols, alkyl esters or ketones, or aromatic compounds, such as ethanol, 1-methoxypropanol, 1-ethoxy-2-propanol, ethyl acetate, butyl acetate, toluene, tetrahydrofuran, cyclopentanone, cyclohexanone, butanone, etc., or mixtures thereof, so long as they are compatible with the mesogenic materials employed.

Preference is given to the use of ethyl acetate and/or cyclohexanone.

Likewise, generally customary additives, such as fillers, further coloured pigments or dyes, for example carbon black, UV stabilisers, inhibitors, flameproofing agents, lubricants, dispersants, redispersants, antifoams, flow-control agents, film formers, adhesion promoters, drying accelerators, drying retardants, photoinitiators, etc., can be added to the coating composition, as already mentioned above.

It goes without saying that the specific material composition of the respective coating composition and the viscosity thereof are dependent on the type of coating process selected and the respective material to be printed. The viscosity of the coating composition is adjusted here in such a way that the best-possible transfer of the coating composition from the respective coating apparatus to the material to be printed can be achieved. This adjustment of the viscosity is carried out directly on the coating machine or printing machine and can be carried out without inventive step based on the coating composition manufacturer's instructions or the expert knowledge of the printer or coating expert. The viscosity is generally determined by determining the efflux time at standard temperature and a particular relative atmospheric humidity in a standardised flow cup (for example DIN 4 flow cup from Fritz Arndt "Frikmar" KG, Germany, or from Erichsen GmbH & Co. KG, Germany) or by measurement using a rheometer (for example from Brookfield E.L.V. GmbH, Lorch, Germany).

The coating composition is preferably applied to the respective substrate by means of a printing process. Conventional printing processes, but in particular a screen printing process or gravure printing process, are employed here.

As already described above, the deformation of the layer comprising the mesogenic material is carried out with the aid of a tool for relief printing, i.e. a printing plate for letterpress printing, letterset printing or preferably for flexographic printing. These are flat printing plates or printing cylinders. The conventional printing plates can be employed. The raised pattern on these printing plates determines the desired three-dimensional pattern in the layer of the coating produced in accordance with the invention that comprises the mesogenic material. The two-dimensional shape of the raised surface of the printing plate determines the geometrical shape of the pattern in this layer (mirror image), while the height of the raised elements on the printing plate determines the maximum penetration depth thereof into the layer. It should be emphasised here that conventional printing plates for relief printing usually have raised elements which have a significantly greater height than the desired penetration depth of these plates into the first layer. It should therefore be ensured when carrying out the process according to the invention that the penetration depth of the relief printing plate into the layer does not exceed 10 µm. This is achieved by contact of the printing plate with the layer comprising the mesogenic material over the entire surface, but with a low contact pressure and a specifically controlled low penetration depth, analogously to a so-called kiss printing process.

The three-dimensional pattern produced in accordance with the invention represents a macroscopic pattern which, depending on the design of the relief printing plate, consists of (preferably uninterrupted) image and/or line elements which have a width of at least 0.3 mm, in particular at least 0.5 mm. It has a maximum depth of 10 µm. The outer shape of the pattern produced in accordance with the invention here is identical with the optically perceptible outer shape of the visible three-dimensional pattern.

Printing plates which have proven particularly suitable for carrying out the embossing step in the process according to the invention are those usually produced for flexographic printing processes. Such printing plates are, in addition, also suitable for use in offset overprint varnishing processes. The printing plates usually used here have surfaces of rubber, elastomers or photopolymers, into which raised elements, the so-called print image relief, are incorporated for the transfer of image dots or line and/or image elements. For the usability in the process according to the invention, it is initially fairly unimportant whether the print image relief here is produced by means of laser engraving or via a photographic/chemical process. In principle, all flexographic printing plates produced by conventional processes are suitable for use as printing plate for relief printing for the production of recesses in the first layer in the process according to the invention. Flexographic printing plates produced for conventional flexographic printing processes, in particular for halftone printing processes, preferably have print dots on the print image relief which are provided with sharp outer edges and are anchored on the printing plate with steep flanks. This achieves precise transfer of the desired print dots in the flexographic printing process, with the print image hardly changing its outer shape at all, even with increasing abrasion of the printing plate. If printing plates of this type are employed in the process according to the invention, the recesses of an individual image dot produced in the layer comprising the mesogenic material likewise have sharp outer edges and a virtually cylindrical shape. Sharp outer edges and steep flanks are likewise obtained if, instead of the individual image dots, uninterrupted image and/or line elements are applied to the flexographic printing plate by conventional processes for the structuring of flexographic printing plates. With both forms, three-dimensional patterns which likewise have clearly structured outer shapes can be obtained via the corresponding rotation of the mesogenic molecules in the layer comprising them.

For certain applications, however, it is advantageous for the three-dimensional patterns produced to have more subtle and softer outer shapes. Such patterns very strongly resemble, for example, the three-dimensional patterns which can be achieved by magnetic alignment of flake-form magnetic pigments and generally have very soft shapes with fluid transitions. For the production of three-dimensional patterns of this type by means of the process according to the invention, it is therefore preferred for the printing plate employed for a relief printing process to be flexographic printing plates, on the surface of which uninterrupted image and/or line elements are arranged, which themselves have rounded-off outer edges.

Flexographic printing plates of this type can be obtained by means of a particular exposure technology using photopolymer printing plates. They can advantageously be produced via the process described in the patent application DE 102010054527.

They have a relief layer comprising raised uninterrupted image elements and/or line elements having an outer surface, and intermediate elements lying below the image and/or line elements, where the image and/or line elements have a width of at least 0.5 mm and where the depth of the intermediate elements in relation to the outer surface of the image and/or line elements is at most 50 µm.

The depth of the intermediate elements here is significantly less than in the case of flexographic printing plates produced by conventional processes.

The raised image and/or line elements on a flexographic printing plate of this type have, in a first embodiment, a planar surface and side flanks in which the transition from the planar surface to the side flank has the shape of an arc, whose length is selected from the length of an arc formed over a mid-point angle in the range from 10° to 90°, where the corresponding radius of the circle is between 0.1 and 50 µm.

In a further embodiment, these image and/or line elements have a cross section which corresponds to a circle segment, where the segment height corresponds to a maximum of 50 µm and the radius of the corresponding circle is in the range from about 100 to 2000 µm, preferably from 100 to 1000 µm.

Both design variants of the cross section of the image and/or line elements may also be combined with one another.

Flexographic printing plates of the type described above are preferably employed in the process according to the invention.

The present invention also relates to a polymeric and/or crosslinked layer comprising mesogenic material which has a three-dimensional macroscopic pattern, where the layer comprising the mesogenic material has on its surface recesses which are not deeper than 10 µm and correspond in their outer shape to the outer shape of the three-dimensional pattern.

The macroscopic three-dimensional pattern consists of image and/or line elements which have a width (line width or width of the image element) of at least 0.3 mm, preferably at least 0.5 mm. A pattern of this type is in accordance with the invention preferably in the form of logos, symbols, alphanumeric characters, bar codes, stripes, geometrical patterns, random patterns, abstract patterns, writing, representations of persons or articles, etc., individually or in combination with one another.

A coating of this type having a three-dimensional pattern is obtainable by the process according to the invention described above.

In the layer comprising the mesogenic material, which is produced in accordance with the invention, the molecules of the mesogenic material in the areas where the first layer has no recesses are in a parallel alignment with the surface of the substrate (unoriented in the plane or optionally also oriented, which, for example on use of cholesteric materials and in the case of a suitable layer thickness, results in a milky-white layer in these areas in the first variant, and in a continuously coloured layer in the second variant), whereas they are turned out of their parallel alignment in the areas where the layer is provided with recesses and are thus aligned at an angle to the substrate surface in the solid or solidified layer. The alignment here can be at an acute, steep or right angle to the substrate surface. This alignment of the molecules of the mesogenic material results in a modified optical behaviour of the mesogenic materials in the areas in question, in particular with respect to their light-reflecting properties, i.e., for example, the reflected colour. Thus, the observer, who generally observes the coating from the perpendicular or from a steep angle, perceives a modified optical image which both actually has a three-dimensional structure and also appears to have a three-dimensional structure to a significantly greater extent. As already described above, the perceived three-dimensional structure in the coating according to the invention is significantly more clearly defined than the actual three-dimensional deformation of the surface of the layer comprising the mesogenic material due to recesses which have a maximum depth of 10 µm. On use of cholesteric materials, the entire layer may be coloured, where the embossed areas of the layer have a modified colour and in addition the entire layer can have an optically variable behaviour, i.e. has a different colour from each different viewing angle.

The low depth of these recesses is also the reason why they are non-tactile to humans, for example with fingers or hand surfaces. This means that the surface of the solidified coating is perceived by touch as non-deformed, while a three-dimensional pattern that appears by means of the variously oriented mesogenic molecules in the layer is optically perceptible. Soiling of the surface due to deposition of dirt in the recesses is therefore practically excluded. In addition, a certain counterfeiting security is present, since the production process cannot readily be deduced via pure observation and tactile examination of the coated substrate.

Suitable substrates for the production of the polymeric layer according to the invention produced are a multiplicity of substrates, as is usually employed for the production of a very wide variety of decorative products and security products.

The term decorative product in the sense of the present invention encompasses a broad range of packaging materials, stationery products, speciality papers, textile materials, decoration materials, advertising materials, teaching materials, joke articles, gift articles, furniture coating films or papers, wallpapers, but also materials for the functional coating and/or artistic decoration of buildings or building parts, highways, signs, vehicles and aircraft, art objects and the like.

Security products in the sense of the present invention are regarded as being, for example, labels, admission tickets, travel tickets, passports, identity documents, banknotes, cheques, credit cards, shares, stamps, chip cards, driving licences, certificates, test certificates, revenue stamps, tax stamps, vehicle licence plates, toll fee stickers, MOT stickers, particulates stickers or seals, to mention only typical products.

Accordingly, the substrates used in accordance with the invention consist of materials such as paper, cardboard, wallpapers, laminates, tissue materials, wood, metals, in particular metal foils, polymers, in particular polymeric films, security printing products or materials which comprise constituents of a plurality of these substances. As usual in the case of papers and polymer films, the substrate may optionally also have been electrostatically pre-treated and/or provided with a primer layer and/or another anchoring layer. The papers employed can therefore be, for example, uncoated, coated or also satinised papers or papers which have a coloured anchoring layer.

As already described above, pre-coatings of the substrates with strongly absorbent, in particular black, or reflective layers, optionally in combination with conventional alignment layers, are also suitable, depending on the type of mesogenic materials employed. As an alternative to black or strongly absorbent or also reflective coatings on the substrates, it is also possible to select substrates which are per se already black, strongly absorbent or reflective.

Substrate materials of this type can be coated using usual coating processes, in particular the majority also using conventional printing processes, and also provided with recesses in the layer comprising the mesogenic material via the use of tools for relief printing.

Particular preference is of course given to substrate materials that are usually also coated by means of printing processes in large runs and via continuous processes, i.e. all types of papers and cardboards as well as polymer films or metal foils and composite materials comprising two or more thereof.

The present invention also relates to the use of a layer produced by the process according to the invention which comprises mesogenic material and is optionally located on a substrate or is self-supporting, in decoration materials or security products, and to corresponding decoration materials and security products. Details in this respect have likewise already been described above.

It is a particular advantage of the present invention that, with the process according to the invention, a process is available for the production of three-dimensional patterns in coatings which can be employed without major additional equipment and technical complexity for the production of three-dimensional patterns in coatings which comprise mesogenic material. Since explicit embossing dies are not used, significant deformation of the applied layer or even of the substrates does not occur, which both reduces the equipment complexity and also helps to avoid possible subsequent soiling of the end products by dirt deposits in the recesses. Since many different types of mesogenic materials can be employed in the layer produced in accordance with the invention, a very wide variety of optical designs are possible and even three-dimensional patterns which are invisible to the naked eye can be obtained. The flowing and soft three-dimensional optical images otherwise only obtainable on use of magnetically alignable pigments are also obtainable for the first time in liquid-crystalline layers by means of the process according to the invention. Furthermore, the process according to the invention can be incorporated well into existing printing operations. The rapid and reproducible production of decorative mass-produced articles or security documents is therefore possible in a simple and inexpensive manner by means of the process according to the invention.

The invention claimed is:

1. A process for producing three-dimensional macroscopic patterns in liquid-crystalline coatings, said process comprising:
    bringing a layer comprising mesogenic material that is applied to a substrate, said layer being formed from a flowable coating composition which comprises a polymerisable and/or crosslinkable mesogenic material and is in an unsolidified state, on the side of the layer facing away from the substrate into contact with a tool, which has a surface with raised elements, in such a way that the raised elements of the tool produce permanent recesses in the layer but not in the substrate,
    removing the tool, and
    solidifying the layer by polymerisation and/or crosslinking, and
    optionally separating the solidified layer from the substrate,
    where the tool is a printing plate for a relief printing process and the recesses in the layer are not deeper than 10 μm, and
    wherein the macroscopic pattern exhibits an outer shape which corresponds to the outer shape of the surface of the raised elements and comprises image and/or line elements having a width of at least 0.3 mm each.

2. The process of claim 1, wherein the recesses in the layer comprising the mesogenic material are not deeper than 5 μm.

3. The process of claim 1, wherein the tool is a flexographic printing plate.

4. The process of claim 3, wherein the flexographic printing plate has a relief layer comprising raised uninterrupted image elements and/or line elements having an outer surface, and intermediate elements lying below the image and/or line elements, where the image and/or line elements have a width of at least 0.5 mm and where the depth of the intermediate elements in relation to the outer surface of the image and/or line elements is at most 50 μm.

5. The process of claim 4, wherein the image elements and/or line elements have a planar surface and side flanks, where the transition from the planar surface to the side flank has the shape of an arc and the length of the arc is selected from the range of the length of the arc formed over a midpoint angle in the range from 10° to 90°, where the circle radius is between 0.1 and 50 μm.

6. The process of claim 4, wherein the image elements and/or line elements have a cross section which corresponds to the shape of a circle segment, where the segment height corresponds to a maximum of 50 μm and the radius of the respective circle is in the range from 100 to 2000 μm.

7. The process of claim 1, wherein the solidification of the layer comprising the mesogenic material takes place under the influence of actinic radiation.

8. The process of claim 1, wherein the substrate is a paper, a cardboard, a wallpaper, a laminate, a tissue material, wood, a polymer, a metal, a security printing product or a material which comprises constituents of a plurality of these substances.

9. The process of claim 8, wherein the substrate is electro-statically pre-treated and/or provided with a primer layer and/or with an alignment layer and/or with another base layer or pre-coating.

10. The process of claim 1, wherein the polymerisable and/or crosslinkable mesogenic material is a cholesteric, smectic or nematic material.

11. The process of claim 10, wherein the polymerisable and/or crosslinkable mesogenic material comprises at least one polymerisable mesogenic compound which contains a polymerisable group, and at least one polymerisable compound which contains two or more polymerisable functional groups.

12. The process of claim 1, wherein the flowable coating composition comprises polymerisable and/or crosslinkable mesogenic material and is solvent-free, free from diluents, free from dispersion media and free from polymerisable or polymeric binders or binder constituents.

13. Polymeric and/or crosslinked layer comprising mesogenic material which has a three-dimensional macroscopic pattern and has on one surface recesses which are not deeper than 10 μm and correspond in their outer shape to the outer shape of the three-dimensional pattern, wherein the polymeric and/or crosslinked layer exhibits a dry layer thickness which is greater than the depth of the surface recesses in the layer and wherein the three-dimensional macroscopic pattern consists of image and line elements which have a width of at least 0.3 mm each and which is obtainable by a process according to claim 1.

14. Layer comprising mesogenic material according to claim 13, characterised in that the pattern comprises logos, symbols, alphanumeric characters, bar codes, stripes, geometrical patterns, random patterns, abstract patterns, writing and/or representations of persons or articles.

15. Decoration material or security product comprising a layer comprising liquid-crystalline material according to claim 13.

\* \* \* \* \*